(12) United States Patent
Nordhaug (10) Patent No.: US 9,658,518 B2
(45) Date of Patent: May 23, 2017

(54) VIDEO STABILIZATION DEVICE AND METHOD

(71) Applicant: Eskil Nordhaug, Scottsdale, AZ (US)

(72) Inventor: Eskil Nordhaug, Scottsdale, AZ (US)

( * ) Notice: Subject to any disclaimer, the term of this patent is extended or adjusted under 35 U.S.C. 154(b) by 0 days.

(21) Appl. No.: 14/620,014

(22) Filed: Feb. 11, 2015

(65) Prior Publication Data

US 2015/0323856 A1    Nov. 12, 2015

Related U.S. Application Data

(60) Provisional application No. 61/938,346, filed on Feb. 11, 2014.

(51) Int. Cl.
| | | |
|---|---|---|
| *H04N 5/228* | (2006.01) | |
| *G03B 17/56* | (2006.01) | |
| *H04N 5/232* | (2006.01) | |
| *H04N 5/76* | (2006.01) | |
| *F16M 13/04* | (2006.01) | |
| *F16M 11/04* | (2006.01) | |
| *F16M 11/12* | (2006.01) | |
| *F16M 11/14* | (2006.01) | |
| *F16M 11/20* | (2006.01) | |
| *F16M 11/28* | (2006.01) | |

(52) U.S. Cl.
CPC ......... *G03B 17/563* (2013.01); *F16M 11/041* (2013.01); *F16M 11/123* (2013.01); *F16M 11/14* (2013.01); *F16M 11/205* (2013.01); *F16M 11/28* (2013.01); *F16M 13/04* (2013.01); *G03B 17/561* (2013.01); *H04N 5/2328* (2013.01); *H04N 5/76* (2013.01)

(58) Field of Classification Search
CPC .................................................... G03B 17/561
USPC ....................................................... 348/208.7
See application file for complete search history.

(56) References Cited

U.S. PATENT DOCUMENTS

| | | |
|---|---|---|
| D418,166 S | 12/1999 | Dill |
| 6,059,249 A | 5/2000 | Scatterday |
| D477,920 S | 8/2003 | McCarty et al. |
| D478,353 S | 8/2003 | Huang |
| 2011/0092915 A1* | 4/2011 | Olson ................. A61M 5/3202 604/198 |
| 2012/0081670 A1* | 4/2012 | Greaves ................ F16M 11/04 352/243 |
| 2014/0205276 A1* | 7/2014 | Johnston ............. G03B 17/561 396/421 |

\* cited by examiner

*Primary Examiner* — Usman Khan
(74) *Attorney, Agent, or Firm* — Charney IP Law LLC (57) ABSTRACT

A video stabilization device has an adjustable length shaft with a proximal end, a distal end, and a midsection between the proximal end and the distal end. A video recording device mount adapted to retain a video recording device is associated with the proximal end of the shaft, a counterweight member is associated with the distal end of the shaft, and a 2-axis gimbal is associated with the midsection of the shaft. A user may grasp the 2-axis gimbal and adjust the length of the adjustable length shaft to generally balance a video recording device retained by the video recording device mount and the counterweight member with the shaft in a predominantly vertical orientation thereby stabilizing a video recording produced by the video recording device. The video stabilization device may optionally be balanced in the horizontal orientation as well.

20 Claims, 10 Drawing Sheets

VIDEO STABILIZATION DEVICE AND METHOD

CROSS-REFERENCE TO RELATED APPLICATIONS

The present application claims benefit of U.S. Provisional Patent Application Ser. No. 61/938,346, filed Feb. 11, 2014, the disclosure of which is incorporated by reference herein

BACKGROUND OF THE INVENTION

The present invention relates to the field of camera image stabilization, and particularly physical camera image stabilization.

In the realm of video production, it is preferable to stabilize a video recording device to mitigate jarring movements during recording, as such movements are considered objectionable to playback viewers. This is particularly true in circumstances where the video recording device is not stationary during recording. Generally, image stabilization can be achieved through hardware, software, or hybrid solutions of hardware and software combined.

Hybrid systems are implemented during recording and are highly technical and specialized. They involve either mechanical stabilization through counteracting movements within a lens or at the image sensor itself. Software systems are also highly specialized and are typically implemented post recording. While there exist a vast array of pure hardware solutions, the majority of these systems are enabled for large Hollywood type video cameras and are therefore cumbersome to use and expensive to obtain.

BRIEF SUMMARY OF THE INVENTION

It would therefore be advantageous to provide a purely hardware based system that is compact, easy to use, and elegant.

In accordance with one embodiment of the present invention in accordance with one embodiment of the present invention a video stabilization device comprises a shaft having a proximal end, a distal end, and a midsection between the proximal end and the distal end, a video recording device mount associated with the proximal end of the shaft, the video recording device mount adapted to retain a video recording device, a counterweight member associated with the distal end of the shaft, and a gimbal associated with the midsection of the shaft. A user may grasp the gimbal to generally balance a video recording device retained by the video recording device mount and the counterweight member with the shaft in a predominantly vertical orientation thereby stabilizing a video recording produced by the video recording device.

The gimbal may be a 2-axis gimbal.

The gimbal may include a gripping surface to aid a user in grasping the gimbal. Preferred gripping surfaces include rubber O-rings.

The shaft may be a telescoping shaft.

The shaft may be a telescoping shaft adjustable in a first length between the video recording device mount and the gimbal and a second length between the gimbal and the counterweight member.

The shaft may be a telescoping shaft adjustable in a first length between the video recording device mount and the gimbal and a second length between the gimbal and the counterweight member, the first length and the second length being different lengths.

The shaft may be a telescoping shaft adjustable in a first length between the video recording device mount and the gimbal and a second length between the gimbal and the counterweight member, the first length and the second length being different lengths, the second length being shorter than the first length to generally balance the video recording device retained by the video recording device mount and the counterweight member when the counterweight member has a weight greater than the combined weight of the video recording device and the video recording device mount.

The shaft may be a telescoping shaft adjustable in a first length between the video recording device mount and the gimbal and a second length between the gimbal and the counterweight member, the first length and the second length being different lengths, the first length being shorter than the second length to generally balance the video recording device retained by the video recording device mount and the counterweight member when the counterweight member has a weight less than the combined weight of the video recording device and the video recording device mount.

The video recording device mount may include an exposed ¼-inch diameter mounting screw adapted to connect to a conventional female threaded video recording device mount.

The video recording device mount may include a grip adapted to frictionally engage a video recording device.

The video recording device mount may include a grip adapted to frictionally engage a video recording device, where the grip comprises a first channel.

The video recording device mount may include a grip adapted to frictionally engage a video recording device, where the grip comprises a first channel, the first channel having a foam insert.

The video recording device mount may include a grip adapted to frictionally engage a video recording device, where the grip comprises a first channel having a series of fingers arranged therein.

The video recording device mount may include a grip adapted to frictionally engage a video recording device, where the grip comprises a first channel and a second channel orthogonal to the first channel, the first channel having a width narrower than a width of the second channel, each of the channels being adapted to accept a video recording device.

The counterweight member may have a free end defined as the furthest end from the gimbal, the free end including a connection member for attaching a weight thereto.

In accordance with another embodiment of the present invention, a method of stabilizing recorded video with a video stabilization device having an adjustable length shaft with a proximal end retaining a video recording device, a distal end having a counterweight member, and a gimbal between the proximal and distal ends, the method including optionally orienting the video stabilization device with the adjustable length shaft in a horizontal orientation; adjusting the length of the shaft between the gimbal and proximal end and/or between the gimbal and the distal end to generally balance the video recording device and the counterweight member about a fulcrum created by the gimbal; orienting the video stabilization device with the adjustable length shaft in a vertical orientation; recording video with the video recording device while grasping the gimbal.

The step of orienting the video stabilization device with the adjustable length shaft in a horizontal orientation may not be performed.

The step of recording video with the video recording device while grasping the gimbal may include apply slight forward and backward pressure on the shaft with the same hand grasping the gimbal.

In accordance with a still further embodiment of the present invention, a video stabilization device comprises an adjustable length shaft having a proximal end, a distal end, and a midsection between the proximal end and the distal end; a video recording device mount associated with the proximal end of the shaft, the video recording device mount adapted to retain a video recording device; a counterweight member associated with the distal end of the shaft; and a 2-axis gimbal associated with the midsection of the shaft. A user may grasp the 2-axis gimbal and adjust the length of the adjustable shaft to generally balance a video recording device retained by the video recording device mount and the counterweight member with the shaft in a predominantly vertical orientation thereby stabilizing a video recording produced by the video recording device.

The adjustable length shaft may be separately adjustable between the distal end and the 2-axis gimbal and the 2-axis gimbal and the proximal end.

DETAILED DESCRIPTION

In the following are described the preferred embodiments of the VIDEO STABILIZATION DEVICE AND METHOD of the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

The phrase "generally balanced" shall be understood to include a condition whereby two objects are in static equilibrium about a fulcrum. "Generally balanced" shall include a condition where the two objects tend to return back toward static equilibrium when moved out of static equilibrium.

Figure 1:
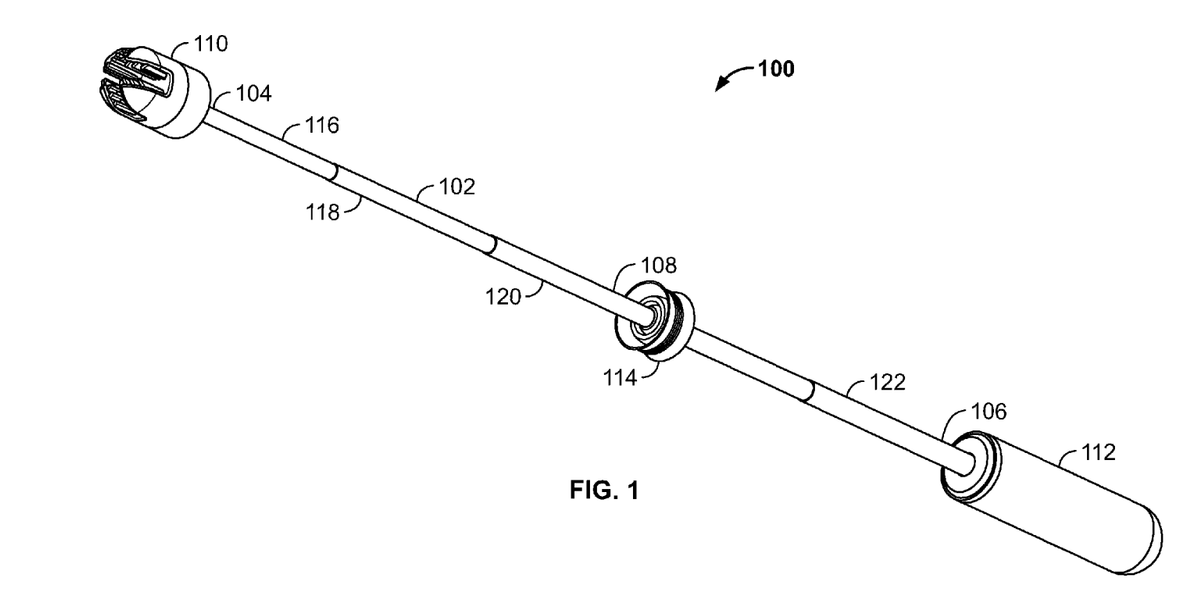
FIG. 1 depicts a perspective view of a collapsible video stabilization device, in accordance with one embodiment of the present invention in its fully extended condition.

FIG. 1 depicts a perspective view of a video stabilization device 100, in accordance with one embodiment of the present invention, the device being in its fully extended condition. The device 100 of FIG. 1 comprises a shaft 102 having a proximal end 104, a distal end 106, and a midsection 108 between the proximal end and the distal end. A video recording device mount 110 is associated with the proximal end 104 of the shaft 102, the video recording device mount being adapted to retain a video recording device (not shown in FIG. 1). A counterweight member 112 is associated with the distal end 106 of the shaft 102 and a gimbal 114 is associated with the midsection 108 of the shaft 102. In the embodiment shown in FIG. 1, the gimbal is a 2-axis gimbal.

It will be appreciated that in use a user may grasp the gimbal 114 to generally balance a video recording device retained by the video recording device mount 110 and the counterweight member 112, with the shaft 102 in a predominantly vertical orientation thereby stabilizing a video recording produced by the video recording device.

Figure 9:
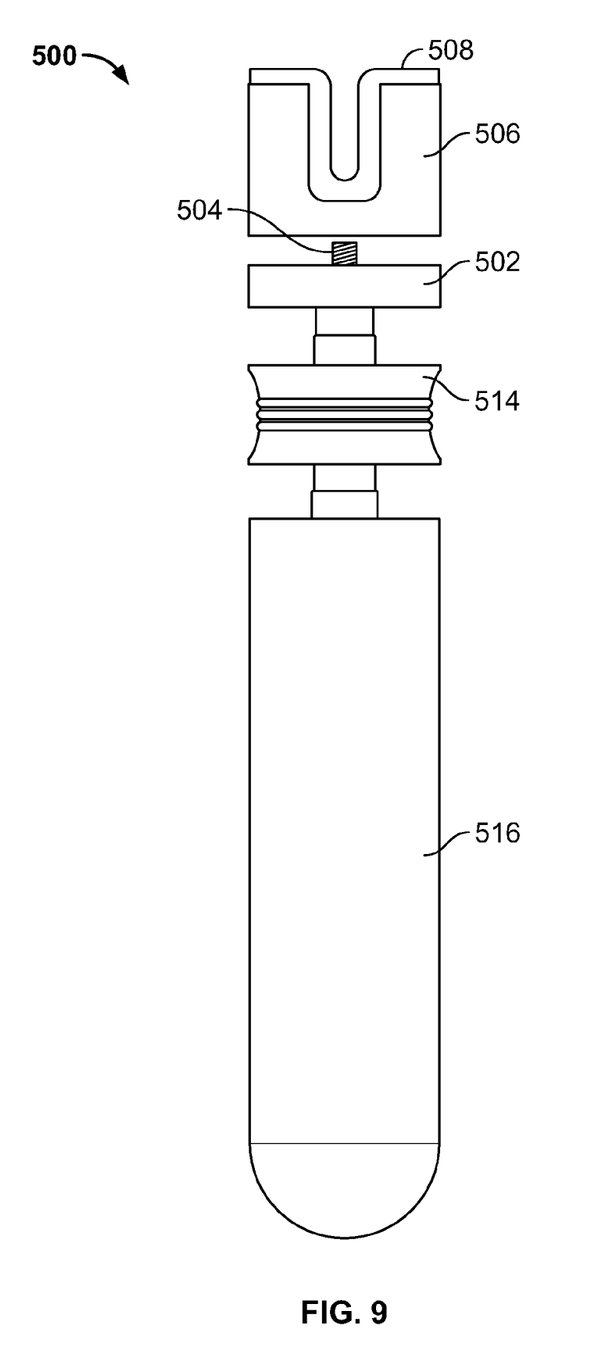
FIG. 9 depicts a side view of a collapsible video stabilization device in accordance with certain embodiments of the present invention in a partially collapsed exploded condition.

As shown in FIG. 1 the shaft 102 may comprise multiple shaft sections, for example shaft sections 116, 118, 120, 122. Each shaft section 116, 118, 120, 122 may be tapered such that a smaller diameter portion fits within a larger diameter portion, thus permitting the shaft 102 to telescope from the extended condition shown in FIG. 1 to a collapsed condition where each of the shaft sections 116, 118, 120, 122 is nested within the adjacent shaft section (as generally shown in FIG. 9). It will be appreciated that other forms of telescoping shafts such as screw fittings and quarter-turn fittings may also be utilized. It will also be appreciated that greater or fewer numbers of shafts may be utilized.

Figure 2:
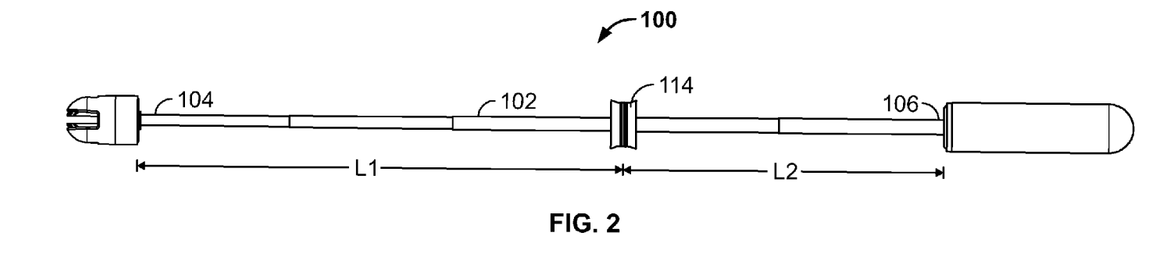
FIG. 2 depicts a side view of the collapsible video stabilization device shown in FIG. 1, also in the extended condition.

Moving temporarily to FIG. 2, it is shown that the shaft 102 includes a length L1 between the proximal end 104 and the gimbal 114 and a length L2 between the gimbal and the distal end 106. These lengths are adjustable from naught to virtually any length dictated by the engineering considerations of the manufacturer giving thought to the weight to the various components of the device 100 in use. For example, the weight of the recording device mount 100 combined with the expected weight of the video recording device to be mounted (not shown in FIG. 2), referred to as MT (mass top) is one consideration. A second consideration is the weight of the counterweight member 112, referred to as MB (mass bottom). Generally, however, the maximum practical lengths are approximately 16 inches for L1 and 11 inches for L2. Preferred lengths are 6 inches for L1 and 5 inches for L2.

The expected weight range of MT is approximately 3 ounces to 25 ounces and the preferred weight range of MB is approximately 15 ounces to 25 ounces. In one specific example, MT is 6 ounces while MB is 15 ounces. In such case, and to generally balance the device 100, L1 is approximately 7 inches and L2 is approximately 6 inches. As a second example MT may be 15 ounces, MB may be 20 ounces, L1 is approximately 7 inches and L2 is approximately 6 inches.

Figure 3:
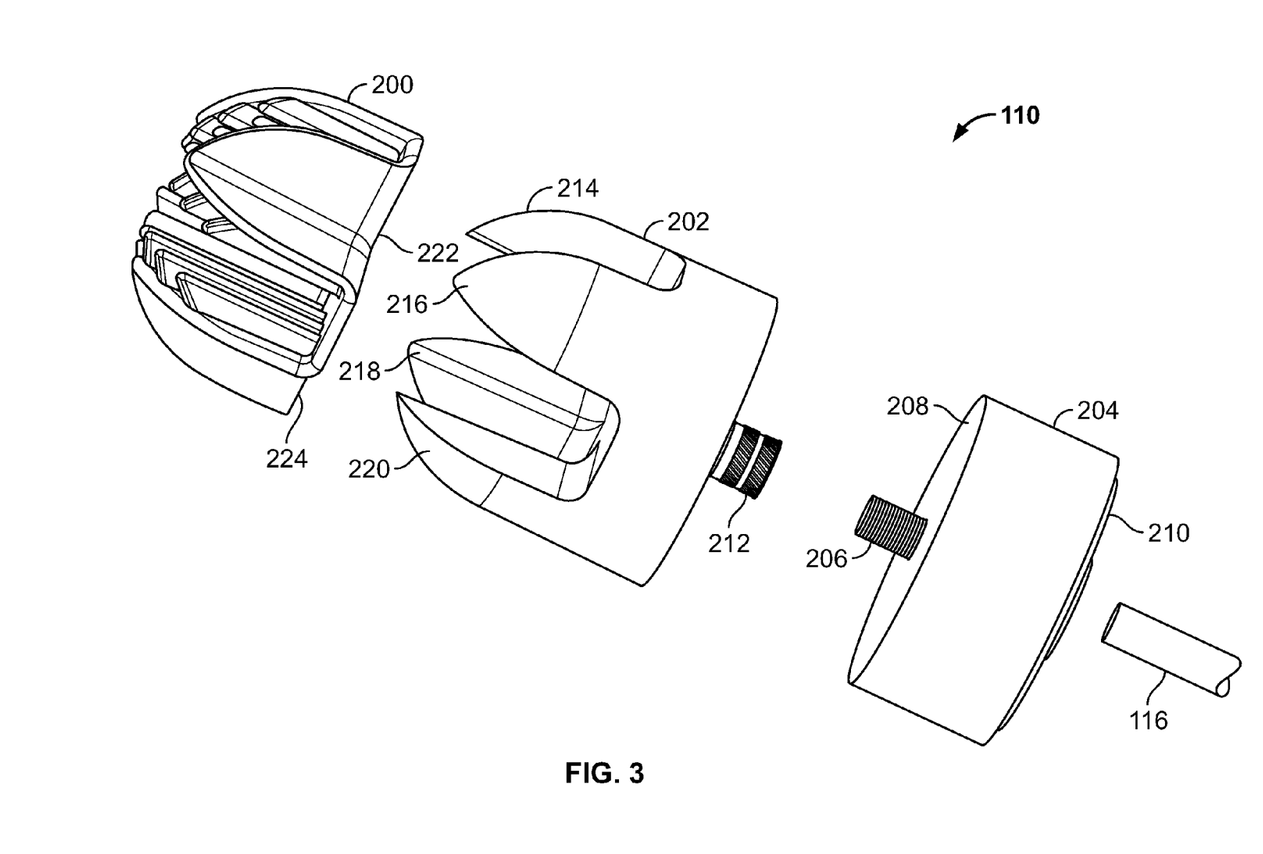
FIG. 3 depicts an exploded perspective view of select components of the video recording device mount of the collapsible video stabilization device shown in FIG. 1.

FIG. 3 depicts an exploded perspective view of select components of the video recording device mount 110, including the grip 200, adapter 202, and mount bracket 204. It will be appreciated that in this embodiment the mount bracket 204 is cylindrical and includes a mounting screw 206 on its face 208 opposite the face 210 where the shaft 116 is attached. Such attachment may be by any suitable form, including chemical adhesion (glue), friction fit, screw fit, or combinations thereof.

The mounting screw 206 may be a ¼-inch diameter screw as is conventional for directly mounting a video recording device, which is conventionally configured with a ¼-inch threaded recess for such purpose. In such case, the video recording device may be so mounted and the remaining portions of the video recording device mount 110 need not be provided.

If provided, the video recording device mount may also include an adapter 202. The adapter 202 is configured to adapt the mounting screw 206 connection of the mount bracket 204 to, in this case, the grip 200. Other gripping means such as foam inserts may alternatively be provided.

The adapter 202 shown in FIG. 3 includes an insert 212 which is internally threaded to match the diameter and thread pattern of screw 206. The insert 212 is lodged within the adapter 202 and secured by chemical adhesion or other means. Alternatively, the adapter 202 may itself be internally threaded in which case the insert 212 may be omitted. However, as the insert 212 is preferably metallic while the adapter 202 is preferably plastic or other lightweight material, it is preferred that the insert 212 be provided to ensure a long lasting and secure connection with screw 206.

Although the adapter 202 may take on many forms, and may itself secure a video recording device without resort to a grip 200, the adapter shown in FIG. 3 is provided with four extending fingers 214, 216, 218, 220. The fingers 214, 216, 218, 220 mate securely with equally numbered, sized, and configured recess 222, 224 (two additional recesses 226, 228 not shown in FIG. 3) provided in grip 200.

Figure 4:
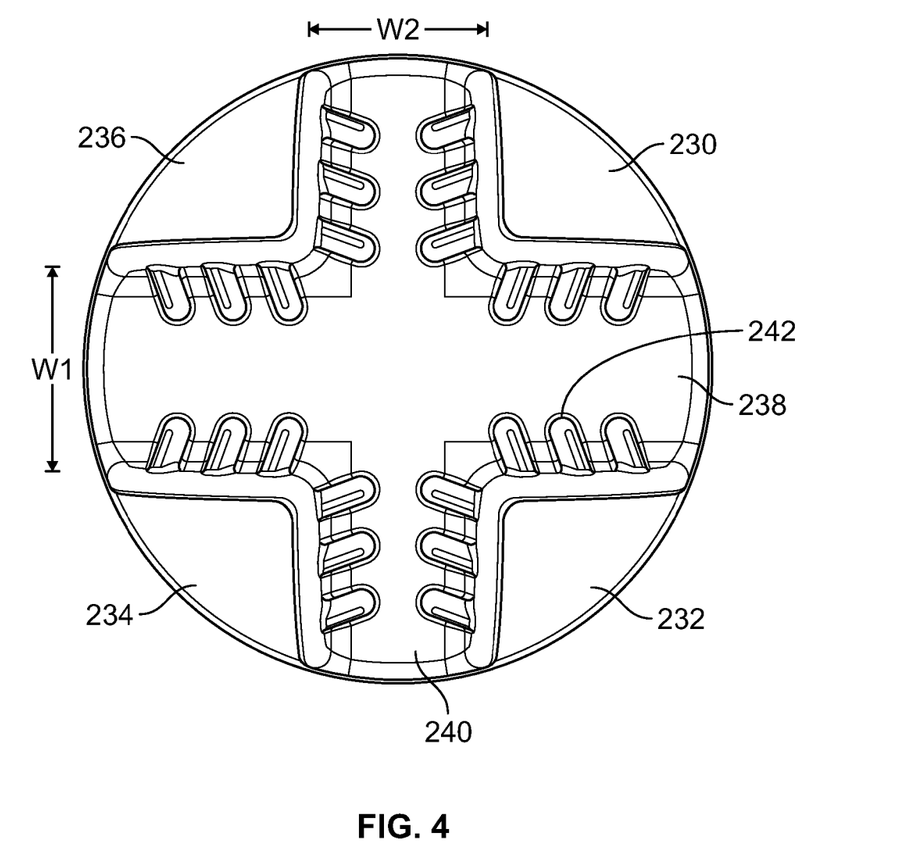
FIG. 4 depicts a top view of the collapsible video stabilization device shown in FIG. 1.

As shown in FIG. 4, a top view of the video stabilization device 100, the recesses 222, 224, 226, 228 form raised projections 230, 232, 234, 236, one each at the four quadrants of the grip 220. The raised projections 230, 232, 234, 236 are separated by a first channel 238 and a second channel 240. The channels 238, 240 each have a plurality of resilient fingers 242 extending therein. It will be appreciated that one of the channels 238, 240 may secure the body of a video recording device in use of the device 100. The resilient fingers 242 aid in this regard by squeezing the video recording device within the channel 238, 240, as the case may be.

It will be appreciated that in the embodiment shown in FIG. 4, first channel 238 is wider than second channel 240. This arrangement is provided so wider and narrower video recording devices may each be secured by the grip 200, the wider devices being used in first channel 238 and the narrower devices being used in second channel 240. By way of example, the first channel 238 may be utilized for cellular phone video recording devices with bulky cases while the second channel 240 may be used for cellular phone video recording devices not using a case, or for point and shoot cameras with video functionality.

The preferred width range W1 of the first channel 238 is between 0.310 inches and 0.378 inches with 0.344 inches being preferred. The preferred width range W2 of the second channel 240 is between 0.235 inches and 0.315 inches with 0.270 inches being preferred.

The materials of construction for the grip include plastics, including overmolded plastics, rubber, or the like. In particular, it is preferred that the fingers 242 be resilient such that they can bend under influence of the mounted video recording device but return to their original shape upon dismounting. Indeed, such resilient quality preferably permits the device 100 to be used "upside-down" such that the video display device, and video recording device mount 110, are below the counterweight member 112 without the video recording device becoming dislodged.

Figure 5:
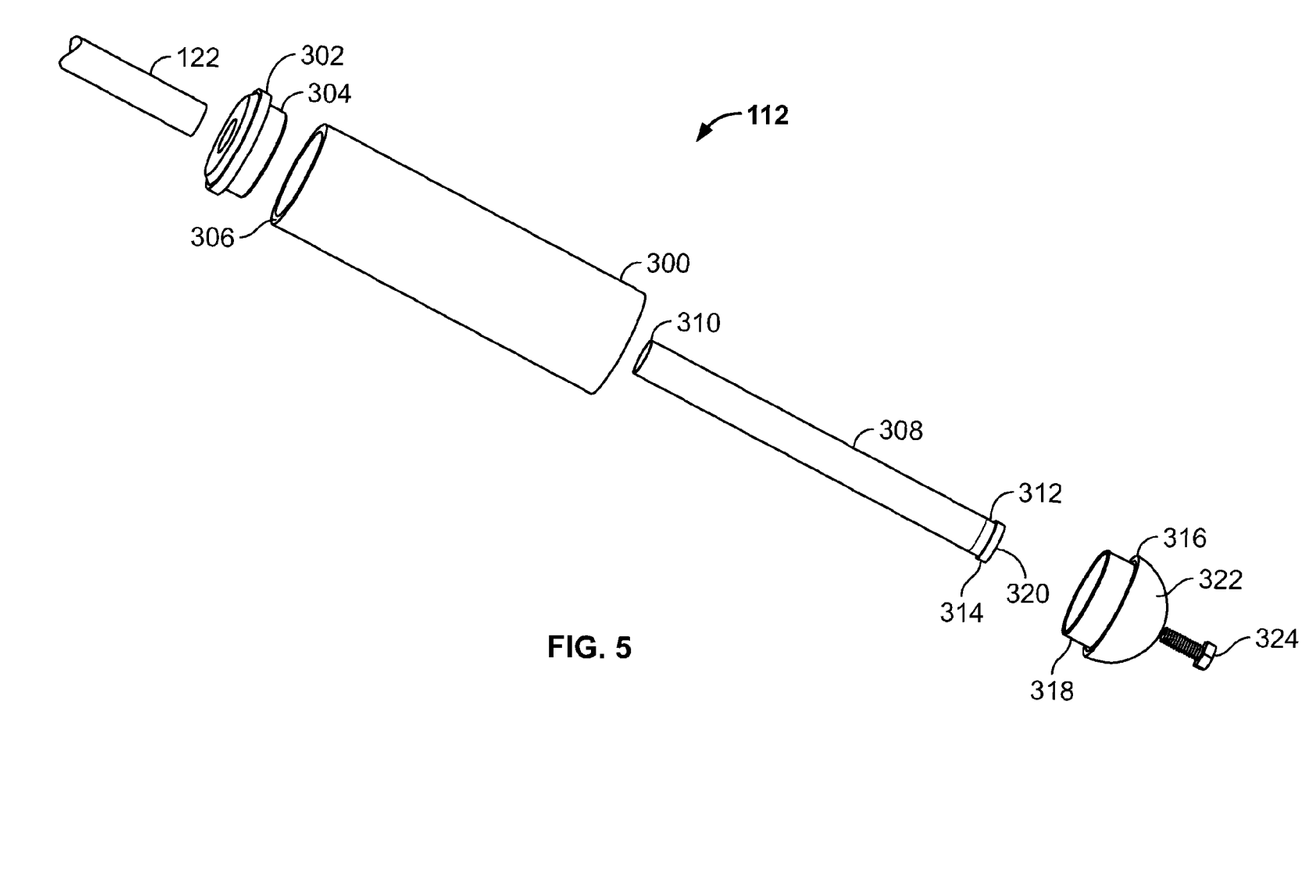
FIG. 5 depicts an exploded perspective view of select components of the counterweight member of the collapsible video stabilization device shown in FIG. 1.
Figure 6:
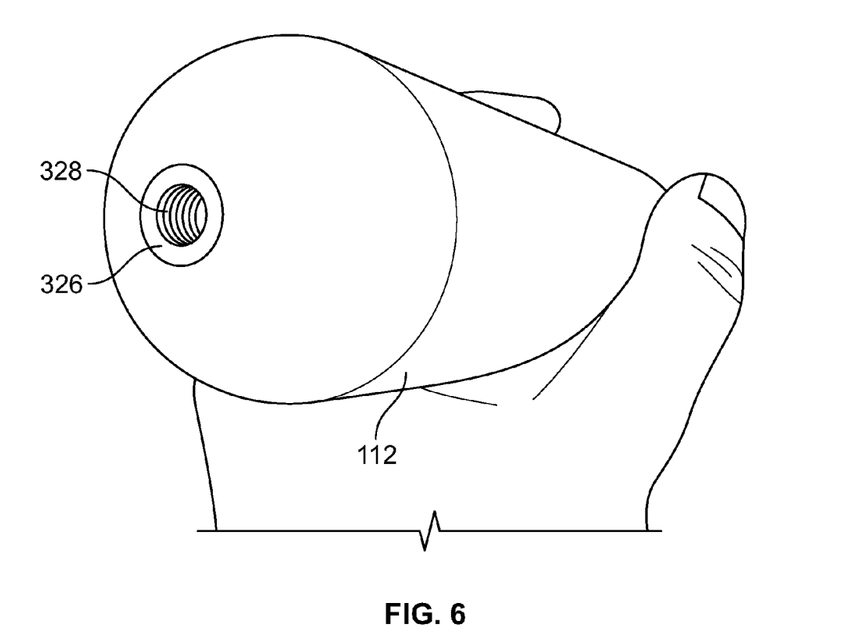
FIG. 6 depicts a rear perspective view of a collapsible video stabilization device in accordance with additional aspects of the present invention.

FIG. 5 depicts an exploded perspective view of select components of the counterweight member 112 of the collapsible video stabilization device 100 shown in FIG. 1. As shown in FIG. 5, the counterweight member 112 is formed from an elongate main body 300 which is generally cylindrical, although other configurations may be utilized. A flange 302 connects shaft section 122 to the main body 300. The flange 302 includes a reduced diameter section 304 that operatively engages an open end 306 of the main body.

Extending from the shaft 122 and through the interior of the main body 300 is a bottom tube 308. The bottom tube 308 is roughly configured to the same diameter as the tapered shafts 116, 118, 120, 122, particularly shaft 122 so that it may engage with same at its proximal end 310. At the distal end 312 of the bottom tube 308 is a flanged connection member 314 for connecting to a pommel 316 formed from a reduced diameter area 318, which fits within a second open end 320 of the main body 300, and a hemisphere end 322, serving as a free end of the device 100. At the extreme free end is an end bolt 324 adapted to extend through the pommel 316 and operatively engage the flanged connection member 314.

The counterweight member 112 typical has an MB of between 15 ounces and 25 ounces, with a preferred MB of 15 ounces.

In other embodiments, the counterweight 112 may be provided without an end bolt 324 but rather may be provided with a recessed head bolt 326 having recessed female threads 328. The recessed female threads may be used to screw on weights (not shown) to increase the MB beyond that of the preconfigured counterweight member 112. The additional weights may be provided to account for MT's which become greater than the design capacity of the device 100 by virtue of an overweight, or heavier than anticipated video recording device being attached. Alternatively, additional weights may be utilized when it is desired to minimize the length of L1 while retaining adequate stability functions of the device 100.

Figure 7:
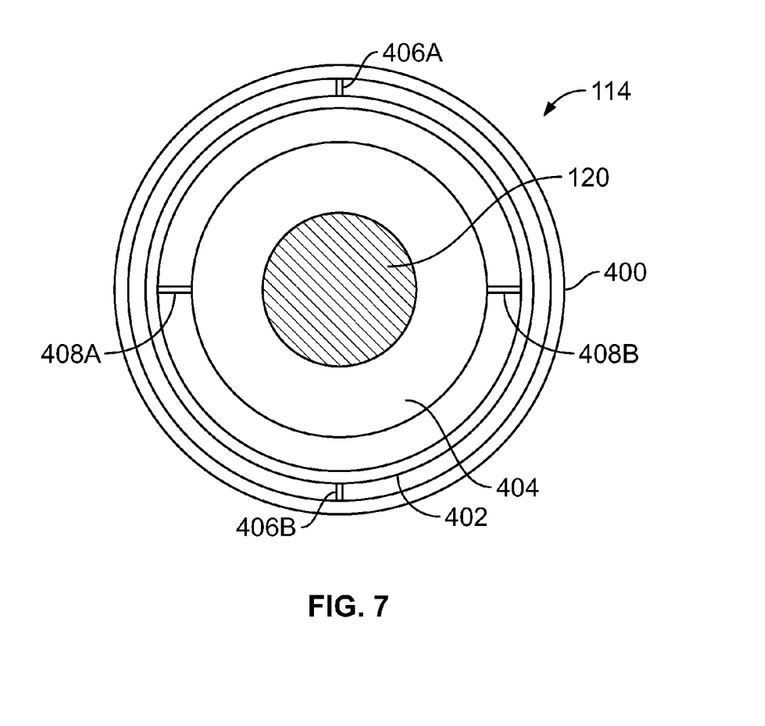
FIG. 7 depicts a cross-sectional view of select components of the 2-axis gimbal of the collapsible video stabilization device shown in FIG. 1.

FIG. 7 depicts a cross-sectional view of select components of the gimbal 114 of the collapsible video stabilization device shown in FIG. 1. As previously discussed, gimbal 114 is a 2-axis gimbal. As such, the gimbal 114 is comprised of an outer member 400, an inner member 402, and a ball 404. The outer member 400 and the inner member 402 are each generally cylindrical and configured such that the inner member 402 is offset inwardly, and located within, the outer member 400. The outer member 400 and inner member 402 are rotatably joined with a pair of rods 406A, 406B sharing a common axis such that the inner member may rotate freely around the axis. Likewise, the ball 404 is rotatably joined with the inner member 402 with a pair of rods 408A, 408B sharing a common axis such that the ball may rotate freely around the axis. It will be appreciated that the two axises, between the outer member 400 and inner member 402 and between the ball 404 and inner member 402, are offset by 90 degrees to create a 2-axis gimbal. These two axises rotate independently of each other, and therefore allow the outer member 400, which functions as the hand grip, to tilt to various degrees while the shaft 102 (and thus all other components) remain still and vertical.

Shaft 120 is fixed within the ball 404 such that shafts 116, 118 may fit within shaft 120 to collapse the proximal end 104 of the device 100 and shaft 122 can fit over shaft 120 to collapse the distal end 106 of the device 100.

Figure 8A:
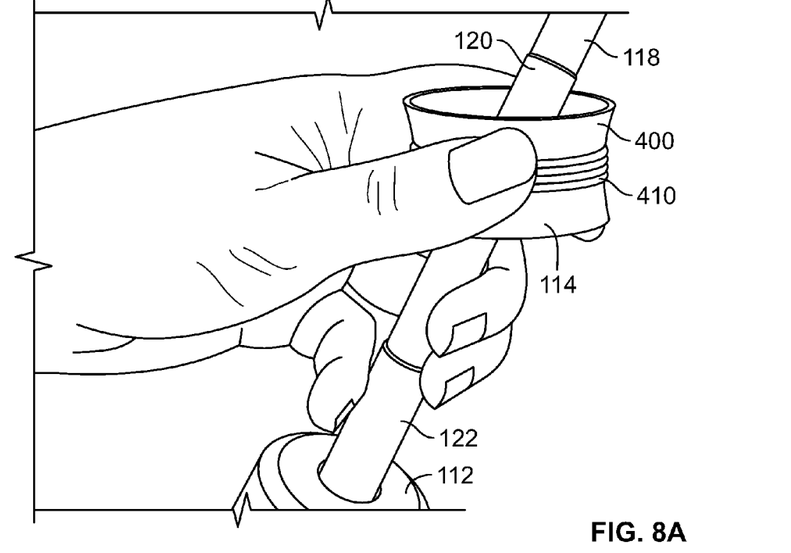
FIGS. 8A and 8B depict side views of the collapsible video stabilization device of FIG. 1, and in particular the vicinity of the 2-axis gimbal.
Figure 8B:
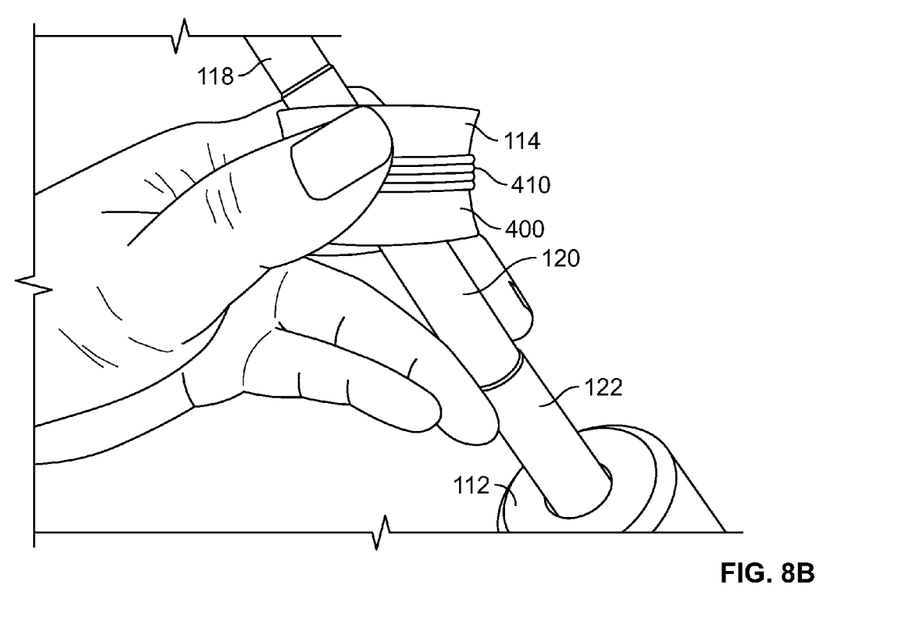

FIGS. 8A and 8B depict side views of the device 100, and in particular the vicinity of the gimbal 114, in two conditions. Before addressing the conditions in later portions of this disclosure, it is noted that the outer member 400 of gimbal 114 is ergonomically shaped in an hourglass configuration with a textured grip 410 at the smallest diameter portion. Preferably, the textured grip 410 is formed from rubber, such as a series of rubber O-rings.

FIG. 9 depicts an exemplary video stabilization device 500 in accordance with other aspects of the invention, notably in a partially collapsed exploded condition. Here, the device 500 includes a mount bracket 502 with a mounting screw 504. Available to be screwed to the mounting screw 504 is an adapter 506 complete with a grip 508. In this embodiment, the grip 508 comprises a simple foam insert with channels 510. The foam may be open cell foam or closed cell foam in a depth and configuration sufficient to retain a video camera. Moving from the mount bracket 502 along shaft 512 is a 2-axis gimbal 514 followed by a counterbalance 516.

Figure 10:
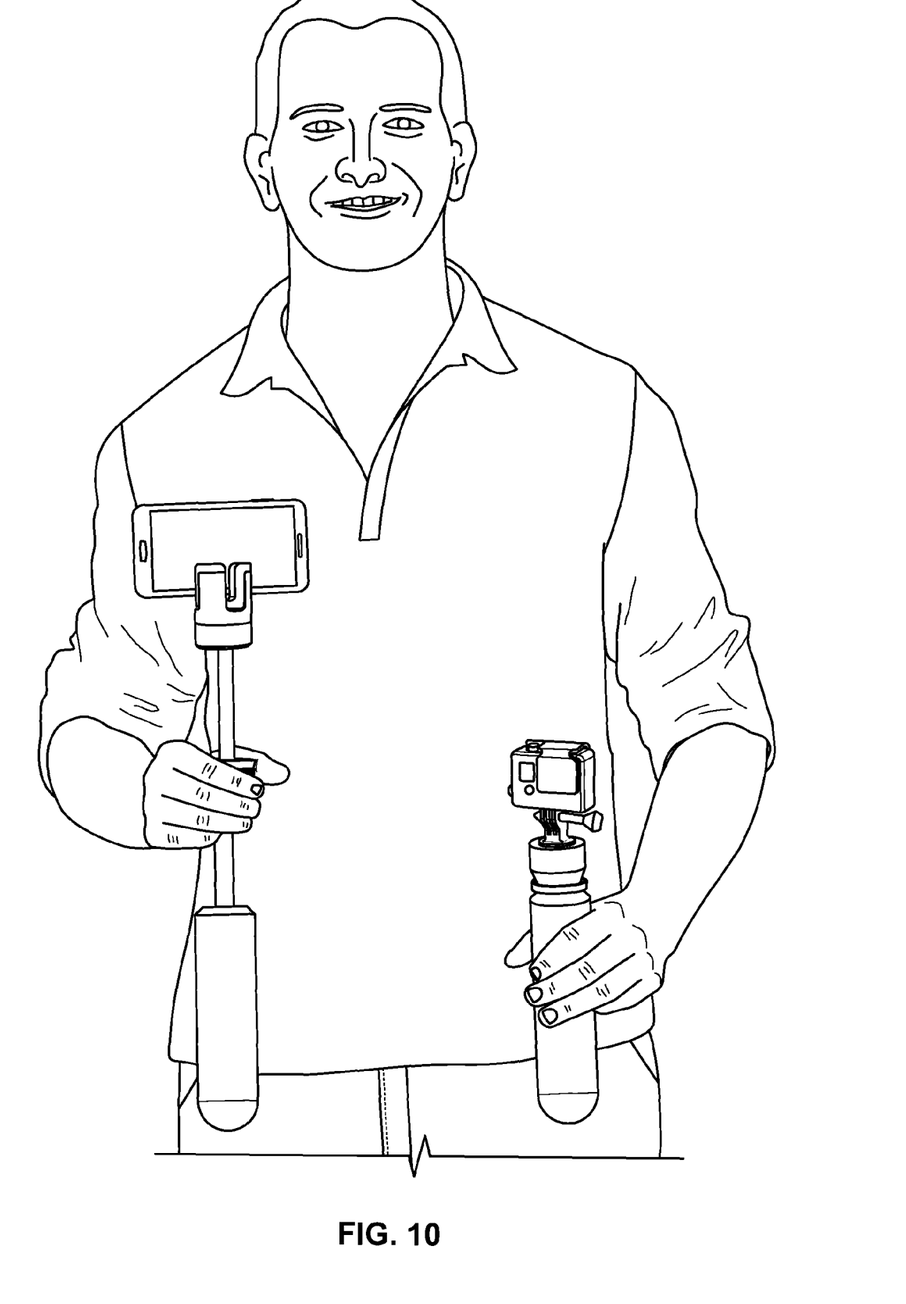
FIG. 10 depicts a user holding collapsible video stabilization devices configured in accordance with certain aspects of the present invention in his right hand, in an expanded condition, and in his left hand, in a collapsed condition.

It will be appreciated that in the fully collapsed condition, device 500 would have the mount bracket 502 and the counterbalance 516 directly abutting the 2-axis gimbal. An example of this configuration is shown in FIG. 10 on the right hand side as viewed by a reader (left hand of the gentleman in the photo). An example of the expanded condition is shown in FIG. 10 on the left hand side as viewed by a reader.

Figure 11:
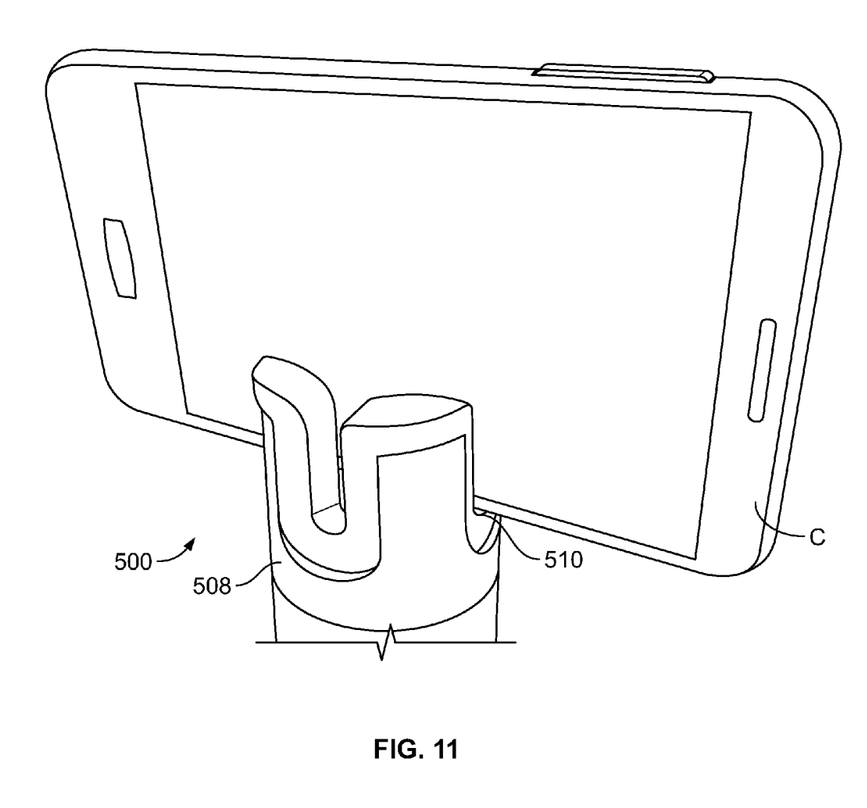
FIG. 11 depicts a perspective view of a cellular phone mounted within a channel of the collapsible video stabilization device shown in FIG. 9.

FIG. 11 depicts a perspective view of a cellular phone C mounted within a channel 510 of the collapsible video stabilization device 500 shown in FIG. 9. As discussed above, the foam 508 is resilient such that the cellular phone C is adequately retained. It has been found that such retention is adequate to hold the cellular phone C upside down for low ground shot videos.

In order to use the collapsible video stabilization devices of the present invention most effectively, a user should grasp the device and extend the shafts generally from the collapsed condition, which is considered a storage condition, to the extended condition. The user will also mount a video recording device within the grip or upon the mounting screw, as the case may be, or may attach the video recording device by other means. The user should then grasp the gimbal without touching the remaining components of the collapsible video stabilization device. The user will then adjust the length of the shaft as between the video recording device mount and the gimbal and the counterweight and the gimbal until the collapsible video stabilization device is generally horizontal, indicating that the video recording device mount (with video recording device mounted) and counterbalance are generally balanced. If necessary or preferred, additional weight may be added to the counterbalance.

The collapsible video stabilization device may then be moved to the vertical position, either with the video recording device up or down. As shown in FIGS. 8A and 8B, a user may continue to grasp the 2-axis gimbal with the thumb and forefinger while adjusting the shaft with the remaining fingers. It will be appreciated that as the collapsible video stabilization device is generally balanced, only gentile nudges of the remaining fingers are required to maintain the vertical orientation. Moreover, by action of the 2-way gimbal, movements of the user, including significant movements such as by briskly walking, are stabilized their effects are mitigated.

Figure 12:
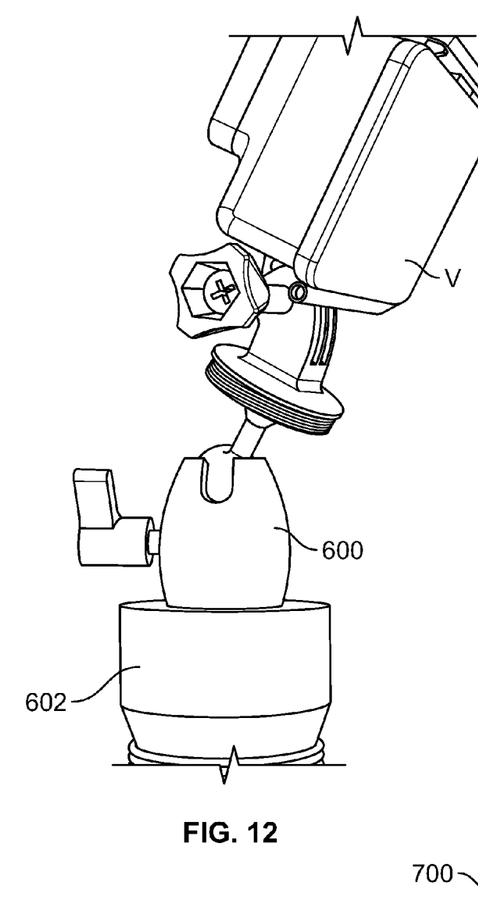
FIG. 12 depicts a ball head mounted to the mounting screw of a video stabilization device in accordance with another embodiment of the present invention.

FIG. 12 depicts a ball head 600 mounted to the mounting screw (not shown) of a representative video stabilization device 602. It will be appreciated that the ball head 600 may be utilized to tilt the video recording device V, attached thereto in the conventional manner, with respect to the vertical orientation of the video stabilization device 602 to permit additional angles of recording if desired.

Figure 13:
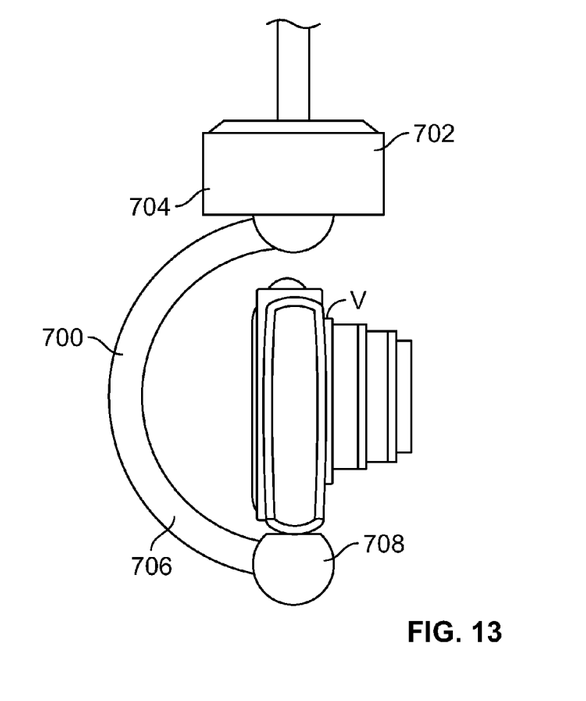
FIG. 13 depicts an upside down mount attached to the mounting screw of a video stabilization device in accordance with a further embodiment of the present invention.

FIG. 13 depicts an upside down mount 700 attached to the mounting screw (not shown) of a video stabilization device 702, and specifically the mount bracket 704 thereof, in accordance with a further embodiment of the present invention. As shown, the upside down mount 700 includes a C-post 706 terminating in a video device mount 708. Other configurations are also possible so long as they do not interfere with the video being shot. The video device mount may use any known means for mounting a video recording device V, including use of a ¼-inch diameter mounting screw (not shown). Through the vast array of possible configurations, the purpose of the upside down mount 700 is to position a camera in an upright orientation while the video stabilization device 702 is itself upside down. The purpose of this is to prevent the camera from "self-rotating" the video such as is achieved automatically in many cellular phone devices, and would be the case if such a video recording device were itself mounted upside down. With the upside down mount, the video recording device may be used for low angle video recording with the image being recorded in the proper orientation.

Materials of construction for the components of the video stabilization device include various metals, plastics, or composites, with specific examples being aluminum, titanium, thin walled steel, or fiberglass for the shaft and gimbal. Preferably the video recording device mount and counterweight are plastic. Additional materials include rubber or foam, for example for the grip.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

I claim:
1. A video stabilization device comprising:
   a shaft having a proximal end, a distal end, and a midsection between said proximal end and said distal end;

a video recording device mount associated with said proximal end of said shaft, said video recording device mount adapted to retain a video recording device;

a counterweight member associated with said distal end of said shaft; and a gimbal associated with said midsection of said shaft, said gimbal including an annular outer ring extending around at least a portion of the circumference of said gimbal;

wherein, when a user directly grasps said outer ring with the thumb and one additional finger of one hand to generally balance a video recording device retained by said video recording device mount and said counterweight member with said shaft in a predominantly vertical orientation, the user is capable of manipulating said shaft with at least two remaining fingers of the one hand to apply slight forward and backward pressure directly on said shaft, thereby stabilizing a video recording produced by the video recording device.

2. The video stabilization device of claim 1, wherein said gimbal is a 2-axis gimbal.

3. The video stabilization device of claim 1, wherein said shaft is a telescoping shaft.

4. The video stabilization device of claim 3, wherein said telescoping shaft is adjustable in a first length between said video recording device mount and said gimbal and separately adjustable in a second length between said gimbal and said counterweight member.

5. The video stabilization device of claim 4, wherein said first length and said second length are different lengths.

6. The video stabilization device of claim 5, wherein said second length is shorter than said first length to generally balance said video recording device retained by said video recording device mount and said counterweight member when said counterweight member has a weight greater than the combined weight of said video recording device and said video recording device mount.

7. The video stabilization device of claim 5, wherein said first length is shorter than said second length to generally balance said video recording device retained by said video recording device mount and said counterweight member when said counterweight member has a weight less than the combined weight of said video recording device and said video recording device mount.

8. The video stabilization device of claim 1, wherein said video recording device mount comprises an exposed ¼-inch diameter mounting screw adapted to connect to a conventional female threaded video recording device mount.

9. The video stabilization device of claim 1, wherein said video recording device mount comprises a grip adapted to frictionally engage a video recording device.

10. The video stabilization device of claim 9, wherein said grip comprises a first channel.

11. The video stabilization device of claim 10, further comprising a foam insert within said first channel.

12. The video stabilization device of claim 10, further comprising a series of fingers arranged within said first channel.

13. The video stabilization device of claim 10, wherein said grip further comprises a second channel orthogonal to said first channel, said first channel having a width differing than a width of said second channel, each of said channels being adapted to accept a video recording device having a length greater than the length of said channel.

14. The video stabilization device of claim 1, wherein said counterweight member has a free end defined as the furthest end from said gimbal, the free end including a connection member for attaching a weight thereto.

15. The video stabilization device of claim 1, wherein said outer ring of said gimbal includes a textured gripping surface extending around the circumference thereof.

16. A method of stabilizing recorded video with a video stabilization device having an adjustable length shaft with a proximal end retaining a video recording device, a distal end having a counterweight member, and a gimbal between the proximal and distal ends, the gimbal including an annular outer ring extending around at least a portion of the circumference of said gimbal, said method comprising:

orienting the video stabilization device with the adjustable length shaft in a horizontal orientation;

adjusting the length of the shaft between the gimbal and proximal end and/or between the gimbal and the distal end to generally balance the video recording device and the counterweight member about a fulcrum created by the gimbal;

orienting the video stabilization device with the adjustable length shaft in a vertical orientation by grasping the outer ring of said gimbal;

recording video with the video recording device while grasping the outer ring of said gimbal, including applying slight forward and backward pressure directly on the shaft with multiple fingers of the same hand grasping the outer ring of said gimbal.

17. The video stabilization device of claim 16, wherein said outer ring of said gimbal includes a textured gripping surface extending around the circumference thereof.

18. A video stabilization device comprising:

an adjustable length shaft having a proximal end, a distal end, and a midsection between said proximal end and said distal end;

a video recording device mount associated with said proximal end of said shaft, said video recording device mount adapted to retain a video recording device;

a counterweight member associated with said distal end of said shaft; and a gimbal associated with said midsection of said shaft, said gimbal including an annular outer ring extending around at least n of the circumference of said gimbal;

wherein a user is capable of grasping said annular outer ring of said gimbal and adjusting the length of said adjustable shaft to generally balance a video recording device with said shaft in a predominantly vertical orientation to stabilize a video recording produced by the video recording device.

19. The video stabilization device of claim 18, wherein said adjustable length shaft is separately adjustable in length between said distal end and said gimbal and said gimbal and said proximal end.

20. The video stabilization device of claim 18, wherein said outer ring of said gimbal includes a textured gripping surface extending around the circumference thereof.

* * * * *